(12) United States Patent
Pelosi

(10) Patent No.: US 7,266,446 B1
(45) Date of Patent: Sep. 4, 2007

(54) HELMET MOUNTED TRACKING SYSTEM AND METHOD

(76) Inventor: Michael J. Pelosi, P.O. Box 3937, Kingman, AZ (US) 86402

( * ) Notice: Subject to any disclaimer, the term of this patent is extended or adjusted under 35 U.S.C. 154(b) by 187 days.

(21) Appl. No.: 10/837,023

(22) Filed: Apr. 29, 2004

Related U.S. Application Data

(60) Provisional application No. 60/470,409, filed on May 13, 2003.

(51) Int. Cl.
*G01B 11/26* (2006.01)
*G01C 1/00* (2006.01)

(52) U.S. Cl. .................. 701/207; 701/10; 701/220; 701/300; 340/980; 340/982; 342/357.14

(58) Field of Classification Search .............. 701/207, 701/220, 200, 205, 300, 302, 4, 6, 10, 14; 340/954, 967, 973, 979, 980, 982; 342/357.8, 342/357.14
See application file for complete search history.

(56) References Cited

U.S. PATENT DOCUMENTS

| | | | | |
|---|---|---|---|---|
| 3,617,015 A | * | 11/1971 | Kinder | 244/3.14 |
| 3,903,398 A | * | 9/1975 | Matthews | 701/221 |
| 3,917,412 A | | 11/1975 | Stoutmeyer et al. | |
| 5,072,218 A | * | 12/1991 | Spero et al. | 340/980 |
| 5,696,347 A | * | 12/1997 | Sebeny et al. | 102/214 |
| 5,737,857 A | * | 4/1998 | Aumann | 36/77 R |
| 5,953,683 A | * | 9/1999 | Hansen et al. | 702/95 |
| 6,351,118 B1 | | 2/2002 | Ackerman et al. | |
| 6,366,835 B1 | * | 4/2002 | Henderson | 701/4 |
| 6,424,410 B1 | | 7/2002 | Pelosi | |
| 6,480,763 B1 | * | 11/2002 | Lappos | 701/3 |
| 6,539,639 B2 | * | 4/2003 | Smith | 33/356 |
| 6,667,694 B2 | * | 12/2003 | Ben-Ari et al. | 340/980 |
| 2002/0193916 A1 | * | 12/2002 | Katz et al. | 701/4 |

OTHER PUBLICATIONS

United States Navy, Navy Training System Plan for the Joint Helmet Mounted Cueing System, Aug. 2001.

* cited by examiner

*Primary Examiner*—Tan Q. Nguyen
(74) *Attorney, Agent, or Firm*—Virtual Legal, P.C.; Michael A. Kerr

(57) ABSTRACT

A helmet mounted tracking system for target designation includes an airplane azimuth sensor, a helmet mounted azimuth sensor, an airplane pitch sensor, a helmet mounted pitch sensor, and a processor. The airplane azimuth sensor determines an azimuth heading for an airplane. The helmet mounted azimuth sensor determines an azimuth heading for a helmet that is worn by a pilot. The airplane pitch sensor determines a pitch for the airplane. The helmet mounted pitch sensor determines a pitch for the helmet that is worn by the pilot. The processor is in operative communication with the airplane azimuth sensor, the helmet mounted azimuth sensor, the airplane pitch sensor, and the helmet mounted pitch sensor and the processor is processes instructions from each of the sensors to determine a target pitch and a target azimuth.

11 Claims, 4 Drawing Sheets

HELMET MOUNTED TRACKING SYSTEM AND METHOD

CROSS REFERENCE

This patent application is related to provisional patent application 60/470,409 which is hereby incorporated by reference. The 60/470,409 patent application was filed on May 13, 2003.

BACKGROUND

1. Field

The invention is related to user controlled navigation. More particularly, the invention is related to the tracking of movements using a helmet.

2. Description of Related Art

Three-dimensional head input systems suitable for controlling a computer cursor rely on detection of signals transmitted from a head-mounted unit to a detection in order to position and/or orientation of the head. Generally, the three-dimensional head input systems have relied on detection of relative light beam intensities or arrival times of transmitted signals from a head unit to a receiver in order to calculate by standard triangulation algorithms the relative position coordinates and/or relative angular orientation of the user's head. Such transmitter/receiver detection systems have the limitation that they can be used to compute the head unit's position or its orientation, but not at the same time with accurate results.

To overcome these limitations, a system for three-dimensional navigation that uses complementary (two-way) position/angle detection to determine the coordinate position along the linear axes and angular orientation along rotational axes was developed. The system comprised a movable unit and a stationary unit. The movable unit is placed on the user's body so that user's movements can be used for three-dimensional navigation control. In U.S. Pat. No. 6,434,410, an embodiment is described in which a movable infrared emitter/detector is worn on the user's head and another stationary infrared emitter/detector is mounted on a stationary object such as a display.

Currently the preferred approach to providing helmet mounted control is used in the Joint Helmet Mounted Cueing system (JHMCS). The JHMCS uses a magnetic field head tracker that is mounted on a helmet. This requires magnetic field sensors mounted into the specialized helmet, and a magnetic field generator mounted inside the aircraft cockpit. The JHMCS system tracks the movement of the helmet within the magnetic field generated within the cockpit. The JHMCS is expensive, complex, and difficult to maintain.

SUMMARY

A helmet mounted tracking system for target designation, comprising an airplane azimuth sensor, a helmet mounted azimuth sensor, an airplane pitch sensor, a helmet mounted pitch sensor, and a processor. The airplane azimuth sensor is configured to determine an azimuth heading for an airplane. The helmet mounted azimuth sensor is configured to determine an azimuth heading for a helmet that is worn by a pilot. The airplane pitch sensor is configured to determine a pitch for the airplane. The helmet mounted pitch sensor is configured to determine a pitch for the helmet that is worn by the pilot. The processor is in operative communication with said airplane azimuth sensor, said helmet mounted azimuth sensor, said airplane pitch sensor, and said helmet mounted pitch sensor. The processor is configured to process instructions from each of the sensors to determine a target pitch and a target azimuth.

The helmet tracking system also comprises a memory having computer readable instructions configured to calculate the target azimuth by calculating a azimuth difference between the azimuth heading for the helmet and the azimuth heading for the airplane. The memory is also configured to calculate the target pitch by calculating a pitch difference between the pitch heading for the helmet and the pitch heading for the airplane.

The airplane azimuth sensor and the helmet mounted azimuth sensor each include a magnetic field sensor configured to use the earth's magnetic field to determine the azimuth heading for the airplane and the azimuth heading for the helmet. The airplane pitch sensor and the helmet mounted pitch sensor each comprise a gravity sensor configured to determine the pitch for the airplane and the pitch for the helmet that is worn by the pilot. Additionally, the processor is configured to process instructions for correcting the gravitational forces generated by said gravity sensor.

In the illustrative embodiment, the helmet tracking system is in operative communication with a targeting weapons system. The targeting weapons system is configured to use the target pitch and the target azimuth to aim a weapon.

A helmet mounted tracking method is also described. The helmet mounted tracking method includes generating an azimuth heading for an airplane and an azimuth heading for a helmet worn by a pilot using the earth's magnetic field. The method then calculates a target azimuth with both azimuth headings. The method then proceeds to generate a pitch for he airplane and a pitch for the helmet that is worn by the pilot using the earth's gravitational field. The method then calculates a target pitch using the airplane pitch and the helmet pitch. The target pitch and the target azimuth are used to aim a weapon.

The target azimuth is calculated by finding an azimuth difference between the azimuth heading for the helmet and the azimuth heading for the airplane. The target pitch is calculated by finding a pitch difference between the pitch heading for the helmet and the pitch heading for said airplane. The method also provides for correcting the pitch for the airplane and correcting the pitch for the helmet to account for changes in gravity.

BRIEF DESCRIPTION OF THE DRAWINGS

Embodiments for the following description are shown in the following drawings.

DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the claims. The following detailed description is, therefore, not to be taken in a limited sense. Note, the leading digit(s) of the reference numbers in the Figures correspond to the figure number, with the exception that identical components which appear in multiple figures are identified by the same reference numbers.

It is desirable in modern jet fighter aircraft to be able to track the movements of the pilot's head in order to aid in target designation in conjunction with using a "heads-up display." In the preferred embodiment, the technology used for head tracking will be able to accurately track the movements of the pilot's head in two axes, namely, the "pitch" (i.e. vertical angle) in relation to the aircraft, and the "azimuth" angle (i.e. horizontal angle) of the pilot's head in relation to the aircraft. Using these two acquired angles, a vector can be computed in the aircraft's onboard computer system to aim missiles at relative targets designated by the pilot.

In the illustrative embodiment the invention utilizes the natural forces of the Earth's magnetic field and the Earth's gravity for helmet tracking. Using these "ambient" magnetic forces and gravitational forces, a more affordable helmet tracking system and method may be implemented. Thus, unlike the JHMCS system described above, it is not necessary to generate a magnetic field within the cockpit. The illustrative embodiment exploits the Earth's magnetic field to determine the azimuth angle and the Earth's gravity field to determine the pitch angle.

Figure 1:
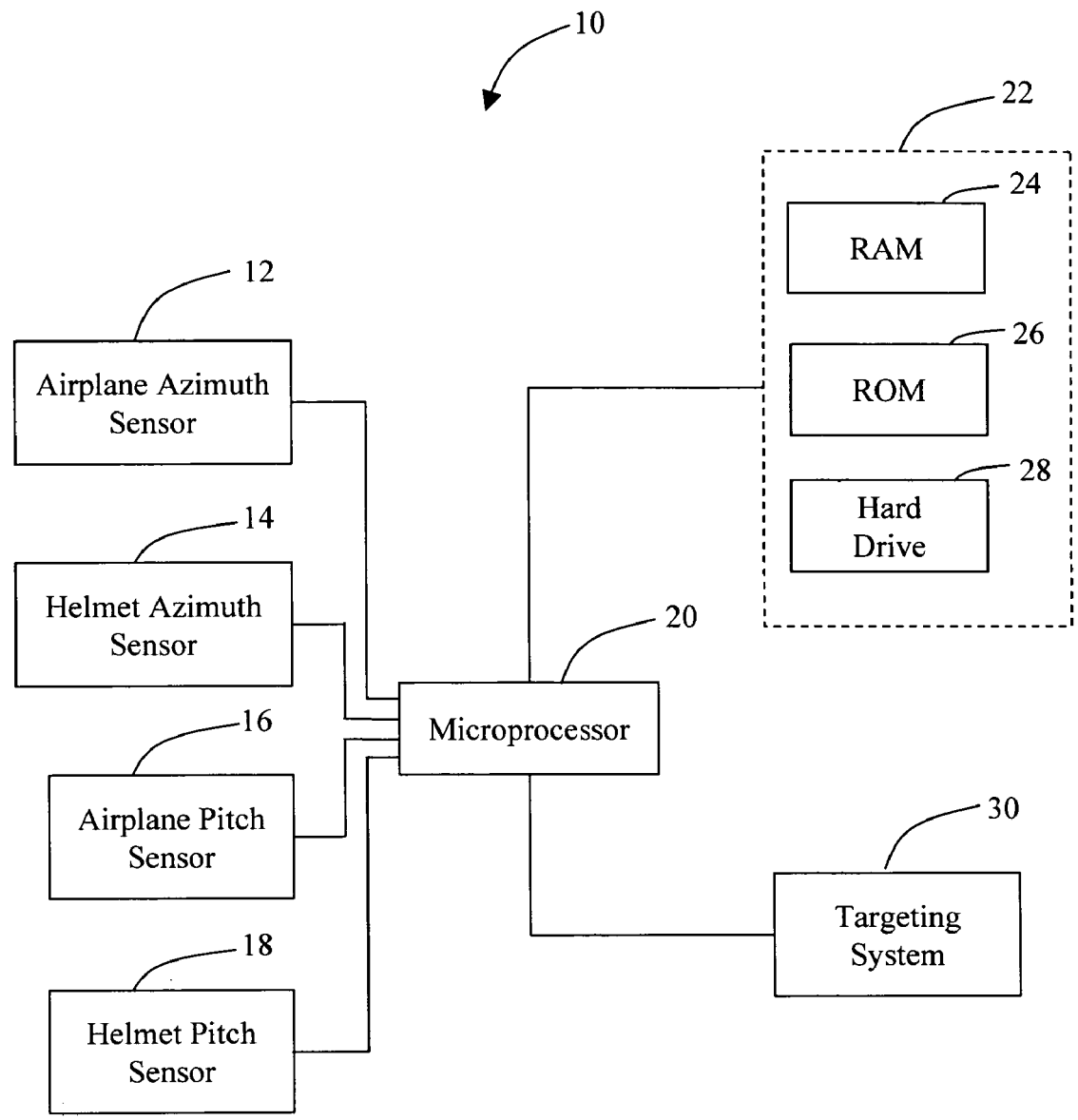
FIG. 1 is an illustrative hardware system that provides helmet mounted tracking.

Referring to FIG. 1 there is shown an illustrative system 10 for providing helmet mounted tracking. The helmet mounted tracking system for target designation, comprises an airplane azimuth sensor 12, a helmet mounted azimuth sensor 14, an airplane pitch sensor 16, a helmet mounted pitch sensor 18, and a processor 20.

The airplane azimuth sensor 12 is configured to determine an azimuth heading for an airplane. The helmet mounted azimuth sensor 14 is configured to determine an azimuth heading for a helmet that is worn by a pilot. The airplane azimuth sensor 12 and the helmet mounted azimuth sensor 14 each include a magnetic field sensor configured to use the earth's magnetic field to determine the azimuth heading for the airplane and the azimuth heading for the helmet.

The airplane pitch sensor 16 is configured to determine a pitch for the airplane. The helmet mounted pitch sensor 18 is configured to determine a pitch for the helmet that is worn by the pilot. The airplane pitch sensor 16 and the helmet mounted pitch sensor 18 each comprise a gravity sensor configured to determine the pitch for the airplane and the pitch for the helmet that is worn by the pilot. Additionally, the processor 20 is configured to process instructions for correcting the gravitational forces generated by said gravity sensor.

The processor is in operative communication with the airplane azimuth sensor 12, the helmet mounted azimuth sensor 14, the airplane pitch sensor 16, and the helmet mounted pitch sensor 18. The processor 20 is configured to process instructions from each of the sensors to determine a target pitch and a target azimuth.

The illustrative helmet tracking system 10 also comprises a memory 22 having computer readable instructions configured to calculate the target azimuth by calculating a azimuth difference between the azimuth heading for the helmet and the azimuth heading for the airplane. The memory 22 is also configured to calculate the target pitch by calculating a pitch difference between the pitch heading for the helmet and the pitch heading for the airplane. By way of example and not of limitation the memory 22 includes random access memory (RAM) 24, read-only memory (ROM) 26 and hard drive memory 28.

In the illustrative embodiment, the helmet tracking system is in operative communication with a targeting weapons system 30. The targeting weapons system 30 is configured to use the target pitch and the target azimuth to aim a weapon towards a target.

Figure 2:
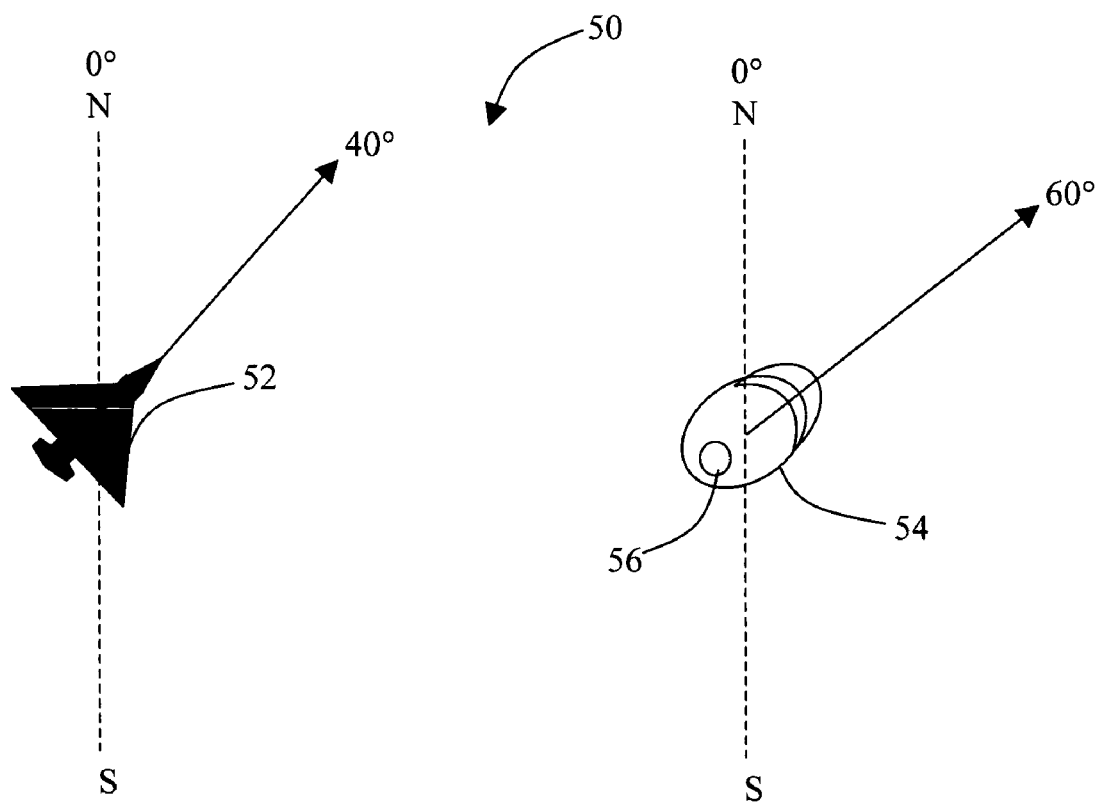
FIG. 2 is an illustrative diagram for performing an illustrative azimuth calculation.
Figure 2:

Referring to FIG. 2 is an illustrative diagram 50 for performing an illustrative azimuth calculation. FIG. 2 provides a top view a jet 52 having an aircraft heading of 40°. The jet 52 includes an azimuth sensor (not shown). A top view is also provided of a pilot's helmet 54 having a pilot heading of 60°. The pilot's helmet includes an azimuth sensor 56 disposed on the "top" of the pilot helmet 54.

The azimuth sensor 56 on the pilot's helmet and the jet azimuth sensor can be compared to compute the relative horizontal angle of the pilot's head with respect to the aircraft's horizontal angle. For the illustrative example, the azimuth calculation results in aiming the weapon at +20° heading off of the aircraft centerline. The following calculation is used to generate the azimuth calculation result:

$$PH-AH=WA$$

where:
PH is the Pilot Heading
AH is the Aircraft Heading
WA is the Weapon Aiming Off Aircraft Center Line Thus, the 60° pilot heading is subtracted from the 40° aircraft heading to generate the relative horizontal angle of +20°.

Figure 3:
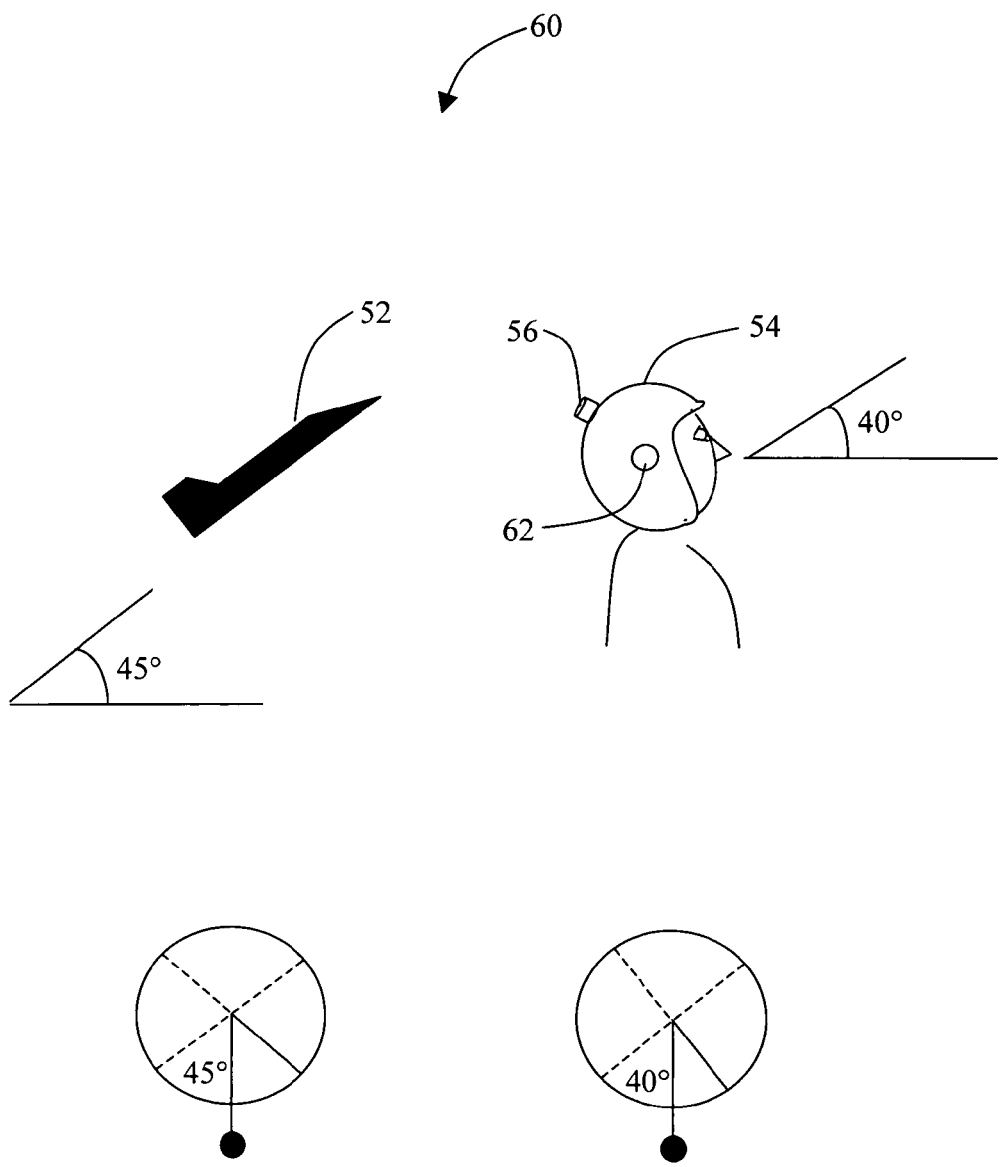
FIG. 3 is an illustrative diagram for performing an illustrative pitch calculation.

Referring to FIG. 3 there is shown an illustrative diagram 60 for performing an illustrative pitch calculation. FIG. 3 provides a side view of the jet 52 in which the aircraft pitch is 45°. The jet 52 includes a pitch sensor (not shown). A side view is also provided of the pilot's helmet 54 having an illustrative pilot head pitch of 40°. The pilot's helmet includes a pilot pitch sensor 62 disposed on the "side" of the helmet. The pilot azimuth sensor 56 is also shown.

The forces of gravity exert a force on an illustrative digital pitch sensor. The output of the sensor would be the number of degrees from horizontal, or perpendicular to the ground. By mounting a digital pitch sensor on the pilot's helmet, and then comparing to the output of the digital pitch sensor to the airplane pitch, the vertical angle of the pilot's head relative to the airplane can be calculated. Thus, the pilot pitch sensor 62 on the pilot's helmet and the jet pitch sensor can be compared to compute the relative vertical angle of the pilot's head with respect to the aircraft's vertical angle. For the illustrative example, the pitch calculation results in aiming the weapon at −5° pitch heading off of the aircraft centerline.

The targeting system then uses the azimuth information and the pitch information to determine the relative azimuth heading is +20° degrees and the relative pitch heading is −5° degrees. As a result, weapons can be accurately aimed using the comparison of the pilot's head orientation to the aircraft orientation.

Figure 4:
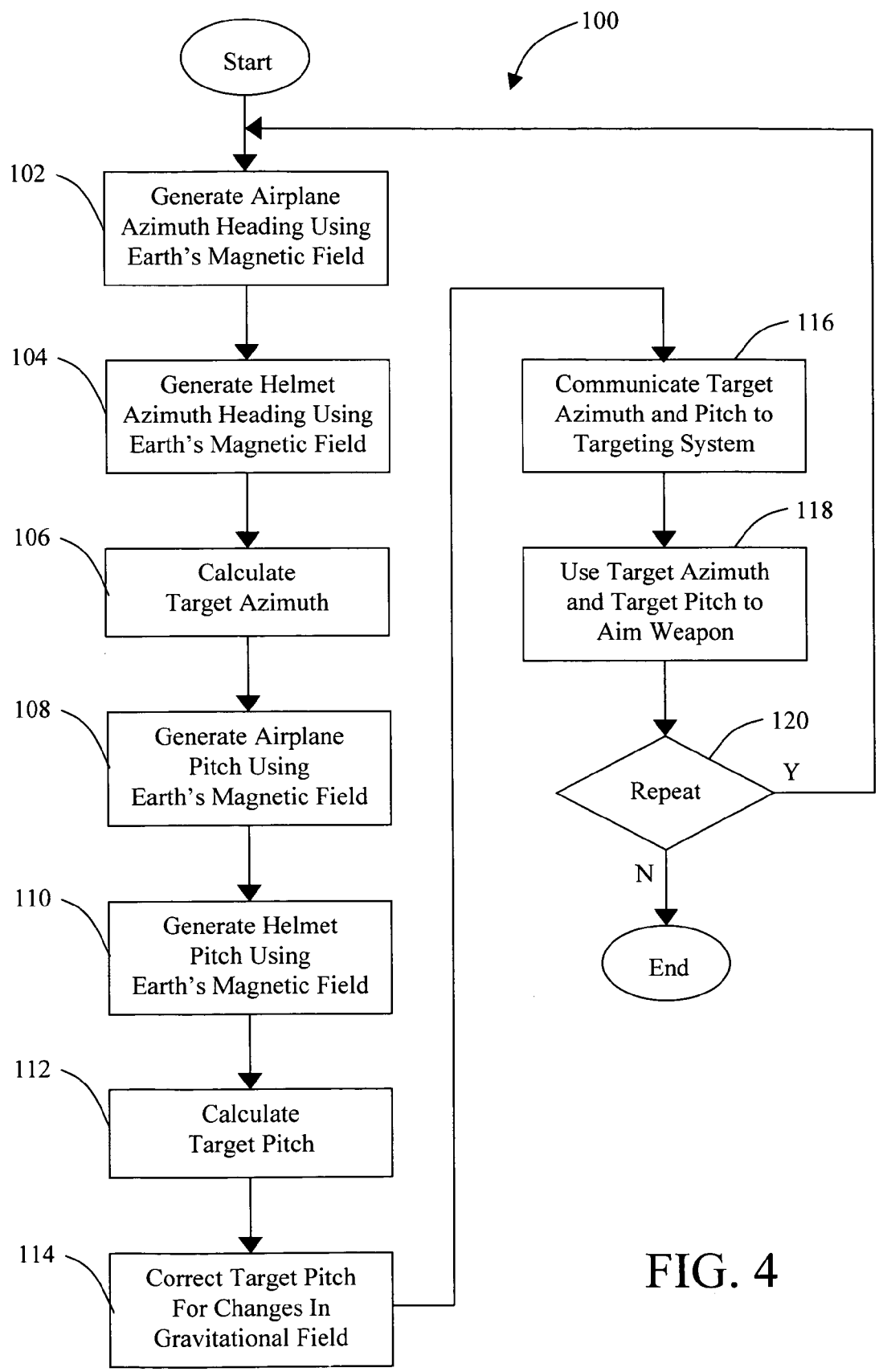
FIG. 4 is a flowchart for a method tracking an object using a helmet mounted tracking method.

Referring to FIG. 4 there is shown a flowchart 100 for a method tracking an object using a helmet mounted tracking method. By way of example and not of limitation, the method is initiated at block 102 in which an azimuth heading for an airplane is generated. At block 104, an azimuth heading for a helmet worn by a pilot is generated. In the illustrative embodiment, the azimuth heading is generated using the earth's magnetic field. At block 106, the method then calculates a relative target azimuth with both azimuth headings.

The method then proceeds to block 108 and generates a pitch for the airplane. At block 110, the method generates a pitch for the helmet that is worn by the pilot. In the illustrative embodiment, the relative pitch heading is generated using the earth's gravitational field. At block 112, the method then calculates a target pitch using the airplane pitch and the helmet pitch. At block 114, the target pitch is corrected for changes in gravitational field which may occur as a result of the jet pulling various gravitational forces. Thus, the method provides for correcting the pitch for the airplane and correcting the pitch for the helmet to account for changes in gravity. The method then proceeds to block 116 in which the target azimuth and target pitch are communicated to the targeting system. The target pitch and the target azimuth are used to aim a weapon as described in block 118. The method proceeds to decision diamond 120 in which the method is repeated as necessary.

As described above, the target azimuth is calculated by finding an azimuth difference between the azimuth heading for the helmet and the azimuth heading for the airplane. The target pitch is calculated by finding a pitch difference between the pitch heading for the helmet and the pitch heading for the airplane.

It shall be appreciated by those of ordinary skill in the art having the benefit of this disclosure that specialized sensors such as digital compass sensors and specialized pitch sensors shall be utilized. Preferably, the sensors should be both accurate and have a fast response time to accommodate for movements in the airplane and in the pilot's head. It shall be appreciated by those skilled in the art that software may be designed to accommodate the sensors.

Additionally, it shall be appreciated by those skilled in the art that changes in gravitational forces will be caused by performing inter alia rolls, dives, and flying upside-down. Thus, even with the forces of gravity offset by momentum, the helmet angle relative to the plane would register the correct difference to the airplane's orientation, even though "down" no longer remains "down to the Earth".

In the illustrative embodiment software is used to compensate for these changes in gravitational forces. Additionally sensors such as roll sensors could be used to output supplemental information to the overall system software to aid in correct calculations of pilot head orientation. Further still, it shall be appreciated by those of ordinary skill in the art having the benefit of this disclosure that specialized sensors could be designed for the particular application described herein.

Finally, it shall be appreciated by those skilled in the art that the reference to airplane is intended to apply generally to craft that flies through the air and includes jet airplanes, propeller airplanes, and any other such flying craft.

Furthermore, alternate embodiments of the invention which implement the systems in hardware, firmware, or a combination of both hardware and software, as well as distributing the modules and/or the data in a different fashion well be apparent to those skilled in the art and are also within the scope of the invention.

Although the description about contains many limitations in the specification, these should not be construed as limiting the scope of the claims but as merely providing illustrations of some of the presently preferred embodiments of this invention. Many other embodiments will be apparent to those of skill in the art upon reviewing the description. Thus, the scope of the invention should be determined by the appended claims, along with the full scope of equivalents to which such claims are entitled.

What is claimed is:

1. A helmet mounted tracking system for target designation, comprising:
   an airplane azimuth sensor configured to determine an azimuth heading for an airplane;
   a helmet mounted azimuth sensor configured to determine an azimuth heading for a helmet that is worn by a pilot;
   an airplane pitch sensor configured to determine a pitch for said airplane;
   a helmet mounted pitch sensor configured to determine a pitch for said helmet that is worn by said pilot;
   a processor in operative communication with said airplane azimuth sensor, said helmet mounted azimuth sensor, said airplane pitch sensor, and said helmet mounted pitch sensor,
   wherein said processor is configured to process instructions digitally from each of said sensors to track the target and establish the target position by determining a target pitch and a target azimuth; and
   a memory having computer readable instructions configured to calculate said target azimuth by calculating an azimuth difference between said azimuth heading for said helmet and said azimuth heading for said airplane, and configured to calculate said target pitch by calculating a pitch difference between said pitch heading for said helmet and said pitch heading for said airplane.

2. The helmet tracking system of claim 1 wherein said airplane azimuth sensor and said helmet mounted azimuth sensor each include a magnetic field sensor configured to use the earth's magnetic field to determine said azimuth heading for said airplane and said azimuth heading for said helmet.

3. The helmet tracking system of claim 2 wherein said airplane pitch sensor and said helmet mounted pitch sensor each comprise a gravity sensor configured to determine said pitch for said airplane and said pitch for said helmet that is worn by said pilot.

4. The helmet tracking system of claim 3 wherein said processor is configured to process instructions for correcting gravitational forces generated by said gravity sensor.

5. The helmet tracking system of claim 1 further comprising a targeting weapons system in operative communication with said processor and said memory, said targeting weapons system configured to use said target pitch and said target azimuth to aim a weapon.

6. A helmet mounted tracking system for target designation, comprising:
   an airplane azimuth sensor configured to determine an azimuth heading for an airplane;
   a helmet mounted azimuth sensor configured to determine an azimuth heading for a helmet that is worn by a pilot;
   an airplane pitch sensor configured to determine a pitch for said airplane;
   a helmet mounted pitch sensor configured to determine a pitch for said helmet that is worn by said pilot;
   a processor in operative communication with said airplane azimuth sensor, said helmet mounted azimuth sensor, said airplane pitch sensor, and said helmet mounted pitch sensor,
   wherein said processor is configured to process instructions digitally from each of said sensors to track the target and establish the target position by determining a target pitch and a target azimuth;
   a memory having computer readable instructions configured to calculate said target azimuth by calculating an azimuth difference between said azimuth heading for said helmet and said azimuth heading for said airplane, and configured to calculate said target pitch by calculating a pitch difference between said pitch heading for said helmet and said pitch heading for said airplane; and a targeting weapons system in operative communication with said processor and said memory, said targeting weapons system configured to use said target pitch and said target azimuth to aim a weapon.

7. The helmet tracking system of claim 6 wherein said airplane azimuth sensor and said helmet mounted azimuth sensor each include a magnetic field sensor configured to use the earth's magnetic field to determine said azimuth heading for said airplane and said azimuth heading for said helmet.

8. The helmet tracking system of claim 7 wherein said airplane pitch sensor and said helmet mounted pitch sensor each comprise a gravity sensor configured to determine said pitch for said airplane and said pitch for said helmet that is worn by said pilot.

9. The helmet tracking system of claim 8 wherein said processor is configured to process instructions for correcting gravitational forces generated by said gravity sensor.

10. A helmet mounted tracking method, comprising
generating an azimuth heading for an airplane with the earth's magnetic field;
generating an azimuth heading for a helmet worn by a pilot with the earth's magnetic field;
digitally calculating a target azimuth with said azimuth heading for said airplane and said azimuth heading for said helmet by calculating the difference between said azimuth heading for said helmet and said azimuth heading for said airplane;
generating a pitch for said airplane with the earth's gravitational field;
generating a pitch for said helmet that is worn by said pilot with the earth's gravitational field;
digitally calculating a target pitch with said pitch for said airplane and said pitch for said helmet by calculating a pitch difference between said pitch heading for said helmet and said pitch heading for said airplane;
tracking the target and establishing the target position from the digital calculation of the target pitch and the target azimuth; and
applying said target pitch and said target azimuth to aim a weapon.

11. The method of claim 10 further comprising correcting said pitch for said airplane and correcting said pitch for said helmet to account for changes in gravity.

* * * * *